W. V. TURNER & J. S. CUSTER.
HIGH SPEED REDUCING VALVE FOR AIR BRAKES.
APPLICATION FILED JAN. 29, 1904.
902,183.
Patented Oct. 27, 1908.
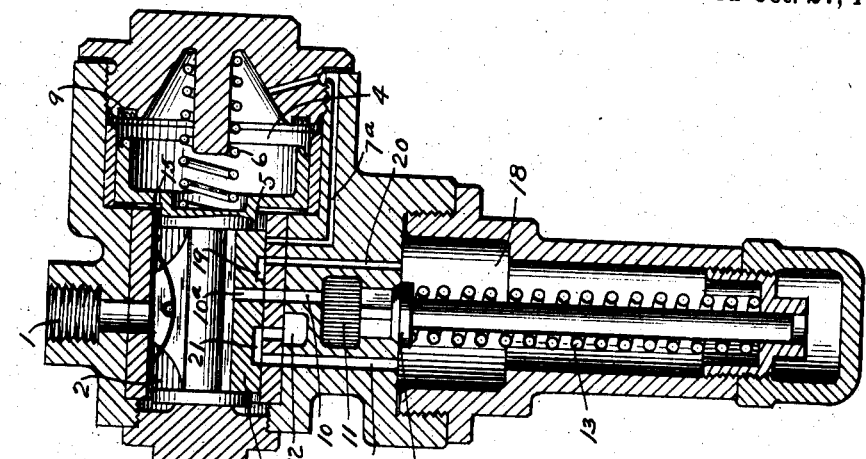
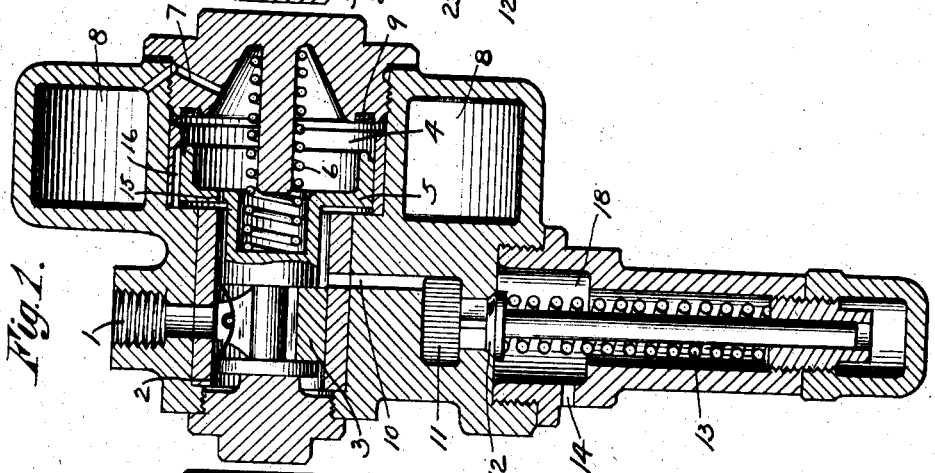
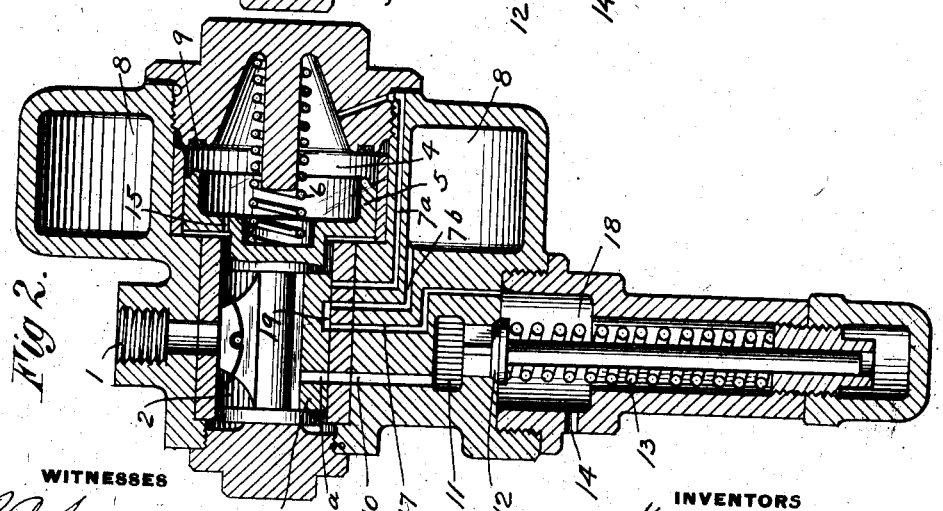
WITNESSES
INVENTORS
Walter V. Turner
John S. Custer
By E. Wright Att'y.

UNITED STATES PATENT OFFICE.

WALTER V. TURNER, OF WILKINSBURG, AND JOHN S. CUSTER, OF PITTSBURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

HIGH-SPEED-REDUCING VALVE FOR AIR-BRAKES.

No. 902,183.   Specification of Letters Patent.   Patented Oct. 27, 1908.

Application filed January 29, 1904. Serial No. 191,129.

*To all whom it may concern:*

Be it known that we, WALTER V. TURNER and JOHN S. CUSTER, citizens of the United States, residing, respectively, at Wilkinsburg and Pittsburg, both in the county of Allegheny and State of Pennsylvania, have invented a certain new and useful Improvement in High-Speed-Reducing Valves for Air-Brakes, of which the following is a specification.

This invention relates to fluid pressure brakes, and more particularly to what is known as a high speed reducing valve adapted to be applied to the brake cylinder for permitting the escape of air above a certain pressure from the brake cylinder and thereby limiting the pressure therein to a certain amount in service applications of the brakes, and for retaining a considerably higher pressure in the brake cylinder for a short period of time in emergency applications and then allowing said higher pressure to reduce to the before mentioned predetermined amount.

In the high speed brake equipment which is now being applied to nearly all passenger train service, the normal degree of pressure carried is much greater than previously used in ordinary train service, and in order to prevent the accumulation of such an excessive pressure in the brake cylinders as to cause the sliding of the wheels in ordinary service applications of the brakes when running at slower speeds, a pressure reducing valve device has heretofore been used, such as shown in Patent No. 506,185 of Oct. 3, 1893.

In emergency applications of the brakes these prior reducing valve devices are actuated by the sudden rush of air to the brake cylinder to move to the extreme position in which only a small restricted outlet is open from the brake cylinder to the atmosphere, but in moving to this extreme position a larger sized outlet is open for an instant and therefore some of the pressure which it is desired to retain just at that moment in the brake cylinder escapes to the atmosphere. In this high speed service in emergency applications of the brake, it is desirable to retain the full high pressure in the brake cylinder for a limited period of time and until the speed of the train has been reduced, and then to open a reducing port and allow the pressure to blow down to a certain predetermined amount for which the device is set and which is a safe braking pressure for lesser speeds.

The object of our invention is to provide an improved valve device for this purpose, by means of which the higher brake cylinder pressure may be fully retained for a limited period in emergency applications and then reduced down to a predetermined amount, while in service applications the brake cylinder pressure may be limited to the desired degree.

In general our invention comprises a relief or blow down valve set to open at a certain pressure for controlling an outlet from the brake cylinder, and means operating in emergency applications of the brakes for holding said outlet passage closed for a limited period of time, and then allowing the same to open.

Another important feature of the invention comprises means for positively determining the period of time during which the outlet passage shall be held closed when an emergency application is made.

The invention also comprises certain other improved features, all of which will be hereinafter more fully set forth.

In the accompanying drawing, Figure 1 is a central sectional view of one form of valve device embodying our improvement; Fig. 2 a similar view showing a modification; and Fig. 3 a similar view showing still another modification.

According to the form of our improvement shown in Fig. 1 the construction comprises a casing containing a valve chamber 2 adapted to be connected by means of the opening 1 with the brake cylinder in the usual way. A slide valve 3 is located in the valve chamber 2 for controlling an outlet port 10 in the valve seat and is operated by a piston 5 in the piston chamber 4, which is in open communication through port 7 with an annular chamber 8 formed in the casing. This is merely one convenient means for securing the desired volume or cubical capacity for the chamber in the rear of the piston and it is obvious that any other arrangement may be employed for this purpose, if preferred.

A feed groove 16 is located in the bushing around the piston 5, while the piston is provided with a through port 15 of a certain capacity. A spring 6 normally holds the piston and slide valve in the position shown, with the outlet port 10 open leading to the chamber 11 of the blow down valve 12. This valve may be of any preferred form, that shown being of the ordinary type having adjustable spring 13 located in chamber 18, which is open to the atmosphere through ports 14.

The operation of this form of our improvement is as follows: The spring 13 of the blow down valve being adjusted for the degree of pressure it is desired to retain in the brake cylinder in service applications of the brakes, when a service application is made the fluid under pressure from the brake cylinder flows into the valve chamber and acts upon the piston 5. The combined capacity of the ports 15 and 16 leading from one side of the piston to the other is sufficient to allow the air to leak past the piston and accumulate pressure in chambers 4 and 8 at substantially the same rate that it can accumulate in the brake cylinder when charging the same from the auxiliary reservoir through the service port of the triple valve in service applications. Therefore the piston 5 will remain substantially balanced as to fluid pressure and the spring 6 will hold the piston and valve in normal position with outlet port 10 open to the blow down valve 12. If an excessive service application should be made, when the brake cylinder pressure rises above the degree for which the spring 13 of the blow down valve is adjusted the said valve will be forced open against the spring and any further accumulation of pressure in the brake cylinder will be prevented by the discharge of the same through the outlet port to the atmosphere.

In emergency applications of the brakes, as is well known, the air is charged into the brake cylinder much more rapidly, so that the pressure accumulates upon the face of the piston 5 faster than it can leak through the ports to the chamber on the opposite side, consequently the piston is immediately moved over against the spring 6 to its opposite position, thereby closing the larger feed groove 16 and seating against gasket 9. In this position, the outlet port 10 leading to the blow down valve is closed and the maximum pressure immediately accumulates in the brake cylinder.

The capacity of the port 15 through the piston is so calculated with reference to the volume of the chambers 4 and 8 in the rear of the piston, that a certain period of time is required for the high brake cylinder pressure to equalize through this port. When the pressure on the rear of the piston has increased so as to be substantially equal to that of the brake cylinder, the spring 6 returns the piston and valve to normal position, thereby opening the outlet port 10 to the blow down valve, so that the brake cylinder pressure will be immediately reduced to that determined by the adjustment of the spring 13 by the discharge of the excessive pressure to the atmosphere. By this means the brake cylinder outlet is held positively closed in emergency applications for a certain predetermined period of time during which it is desired to retain the maximum braking pressure, and after that time the pressure is rapidly reduced down to a safe degree for slower speeds.

According to the modification shown in Fig. 2, communication between the piston chamber 4 and larger chamber 8 is made through the ports 7$^a$ and 7$^b$ which lead to the slide valve seat and are controlled by said slide valve. Another port 17 leads to the atmosphere, while the slide valve is provided with a port 10$^a$, for normally communicating with outlet port 10, and a cavity 19 for opening communication between ports 7$^a$ and 7$^b$ and thereby connecting the chambers 4 and 8 together in one position, while in its normal position the port 7$^a$ is closed and the port 7$^b$ connected with the atmosphere through exhaust port 17. By means of this construction, the feed groove 16 may be dispensed with, since the capacity of the piston chamber by itself is so small that in service applications the brake cylinder pressure will equalize through the port 15 into this chamber, substantially as rapidly as it accumulates in the brake cylinder and the piston will not be moved. In emergency applications, however, the piston and valve will be moved over by the sudden rush of air as before desribed, thereby closing the outlet 10 and at the same time connecting the chambers 4 and 8 through ports 7$^a$, 19 and 7$^b$. This gives the same capacity of chamber to be supplied through the small port 15 to determine the length of the limited period of time that the valve will remain in this position and hold the outlet port closed to the blow down valve, as described in connection with Fig. 1. When the valve is returned to its normal position, the brake cylinder is opened to the blow down valve and the chamber 8 is released to the atmosphere through port 7$^b$, cavity 19 and exhaust port 17. The principal advantage of this arrangement is that it is not necessary to fill the larger chamber 8 with air from the brake cylinder in each ordinary service application of the brakes and therefore economizes the air to that extent.

Fig. 3 shows another modification in which the chamber 18 of the spring 13 is utilized in the place of the additional chamber 8 illustrated in Figs. 1 and 2. The chamber 18 must of course in this case be made air tight and a port 20 leads to the valve seat in place of port 7$^b$ to be connected by the cavity 19 with port 7$^a$ and the piston chamber 4 in emergency applications. An additional outlet port 23 also leads from this chamber to the valve seat and normally communicates with the exhaust port 22 through cavity 21 in the slide valve.

In service applications, the brake cylinder pressure equalizes through the port 15 into the small chamber 4 and the piston and slide valve remain in the normal position with the outlet port 10 open to the blow down valve and the spring chamber 18 open to the atmosphere through ports 23, 21 and 22. In emergency applications, the piston is actuated by the rapid accumulation of pressure upon its face to move over against its gasket, thereby closing outlet ports 22 and 10 and opening communication between chambers 4 and 18 through ports 7ª and 20 and cavity 19. The combined capacities of these chambers 4 and 18 gives the desired volume which, in connection with the size of the port 15, determines the length of time required to substantially equalize the fluid pressures on the opposite sides of the piston, then as the spring moves the valve back to its normal position the outlet passage is opened from the brake cylinder through the blow down valve to the atmosphere. The advantage of this construction is that the valve device may be made much smaller and more compact.

It will now be seen that in all of these modifications the outlet from the brake cylinder through the reducing or blow down valve is maintained open at all times in service applications of the brakes, so that the braking pressure is then limited to the predetermined amount; while in emergency applications the brake cylinder outlet through the blow down valve is instantly closed and held closed for a predetermined limited period of time, which may be varied to any desired amount, thereby maintaining the maximum braking pressure until the speed is sufficiently reduced, and then permitting the brake cylinder pressure to rapidly blow down to a safe degree for slower speeds.

Having now described our invention, what we claim as new and desire to secure by Letters Patent is:—

1. A reducing valve device for air brakes, comprising a valve mechanism set to open at a certain pressure for controlling an outlet from the brake cylinder, and means operating in emergency applications for closing communication from the brake cylinder to said valve mechanism.

2. A reducing valve device for air brakes, comprising a valve mechanism governed by the opposing pressures of the brake cylinder and an adjustable spring for controlling an outlet from the brake cylinder, and means operated by the rise in brake cylinder pressure in emergency applications for closing communication from the brake cylinder to said valve mechanism.

3. A reducing valve device for air brakes, comprising a valve governed by the opposing pressures of the brake cylinder and an adjustable spring for controlling an outlet from the brake cylinder, and a time mechanism operated by the rapid increase in brake cylinder pressure in emergency applications for holding said outlet entirely closed for a limited period of time and then opening the same.

4. A reducing valve device for air brakes, comprising a valve governed by the opposing pressures of the brake cylinder and an adjustable spring for controlling an outlet from the brake cylinder, and a time mechanism comprising a piston and valve for temporarily closing said outlet in emergency applications previous to the opening of said valve.

5. A reducing valve device for air brakes, comprising a valve for controlling an outlet from the brake cylinder, a piston operating in emergency applications to temporarily hold said outlet closed, and means for gradually equalizing the fluid pressure upon opposite sides of said piston.

6. A reducing valve device for air brakes, comprising a valve for controlling an outlet from the brake cylinder, a piston operated by the rapid increase in brake cylinder pressure in emergency applications for temporarily holding said outlet closed, and means for gradually equalizing the fluid pressures upon opposite sides of said piston.

7. A reducing valve device for air brakes, comprising a blow down valve for controlling an outlet from the brake cylinder, another valve for controlling the passage through said blow down valve, a piston operated by the brake cylinder pressure in emergency applications for temporarily holding said outlet closed and means for gradually equalizing the fluid pressures upon opposite sides of said piston.

8. A reducing valve device for air brakes, comprising a blow down valve for controlling an outlet from the brake cylinder, another valve for controlling the passage through said blow down valve, a piston operated by the brake cylinder pressure in emergency applications for temporarily holding said outlet closed, a spring for normally holding said valve open, and means for gradually equalizing the fluid pressures upon opposite sides of said piston.

9. A reducing valve device for air brakes, comprising a valve for controlling an outlet from the brake cylinder, a piston operated by a rapid variation in fluid pressure upon one side thereof in emergency applications for temporarily holding said outlet closed, and means for gradually equalizing the fluid pressures upon opposite sides of said piston.

10. A reducing valve device for air brakes, comprising a valve for controlling an outlet from the brake cylinder, a piston subject to the opposing pressures of the brake cylinder and a chamber of predetermined capacity for operating said valve, and an equalizing port from one side of said piston to the other.

11. A reducing valve device for air brakes, comprising a valve for controlling an outlet from the brake cylinder, a piston for operating said valve and subject to the opposing pressures of the brake cylinder and a small chamber in service applications of the brakes, an equalizing port from one side of said piston to the other, and means operated by the movement of the piston in emergency applications for increasing the capacity of said equalizing chamber.

12. A reducing valve device for air brakes, comprising a blow down valve controlling an outlet from the brake cylinder, a piston subject to opposing fluid pressures, a small chamber on one side of said piston, an equalizing port from one side of said piston to the other, a second chamber, and a valve operated by said piston in emergency applications for closing the outlet through the blow down valve and opening communication between said chambers.

13. A reducing valve device for air brakes, comprising a blow down valve having an adjustable spring and spring chamber for controlling an outlet from the brake cylinder, a piston subject to opposing fluid pressures, a small chamber on one side of said piston, an equalizing port from one side of the piston to the other, and a valve operated by said piston in emergency applications for temporarily closing the outlet through the blow down valve and opening communication between said small piston chamber and the spring chamber.

14. A reducing valve device for air brakes, comprising a valve mechanism governed by the opposing pressures of the brake cylinder and an adjustable spring for controlling an outlet from the brake cylinder, and a time mechanism operating in emergency applications for closing communication from brake cylinder to said valve mechanism for a limited period and then opening said communication.

15. A reducing valve device for air brakes, comprising a valve mechanism governed by the opposing pressures of the brake cylinder and an adjustable spring for controlling an outlet from the brake cylinder, and a time mechanism operated by the rise in brake cylinder pressure in emergency applications for closing communication from the brake cylinder through said valve mechanism for a limited period and then opening said communication.

In testimony whereof we have hereunto set our hands.

WALTER V. TURNER.
JOHN S. CUSTER.

Witnesses:
R. J. EMERY,
JAS. B. MACDONALD.